US012676893B2

(12) United States Patent
Fontenot et al.

(10) Patent No.: US 12,676,893 B2
(45) Date of Patent: Jul. 7, 2026

(54) FIRST-TIME USER EXPERIENCE SYSTEMS AND METHODS FOR WORKLOAD PROTECTION SOLUTIONS

(71) Applicant: Cisco Technology, Inc., San Jose, CA (US)

(72) Inventors: Gabriel J. Fontenot, Richardson, TX (US); Paul Mach, San Jose, CA (US); Tony Lee, San Jose, CA (US); Jana Radhakrishnan, San Jose, CA (US); Apurva Chhajed, San Jose, CA (US); Amandeep Singh, Apex, NC (US); Brijeshkumar Shah, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 18/521,791

(22) Filed: Nov. 28, 2023

(65) Prior Publication Data

US 2025/0175500 A1 May 29, 2025

(51) Int. Cl.
*H04L 9/40* (2022.01)

(52) U.S. Cl.
CPC .................................... *H04L 63/20* (2013.01)

(58) Field of Classification Search
None
See application file for complete search history.

(56) References Cited

U.S. PATENT DOCUMENTS

| | | | |
|---|---|---|---|
| 9,300,691 B1 | 3/2016 | Banerjee | |
| 11,588,859 B2 | 2/2023 | Keiser, Jr. | |
| 2016/0234224 A1 | 8/2016 | Ashley et al. | |
| 2020/0382363 A1 | 12/2020 | Woolward et al. | |
| 2021/0234900 A1* | 7/2021 | Francis ................. | H04M 15/66 |
| 2022/0210194 A1 | 6/2022 | Parekh et al. | |
| 2023/0188571 A1 | 6/2023 | Kung et al. | |

OTHER PUBLICATIONS

International Search Report and Written Opinion for International Application No. PCT/US2024/056548, mailed Feb. 17, 2025, 15 Pages.

(Continued)

*Primary Examiner* — Cai Y Chen
(74) *Attorney, Agent, or Firm* — Rutan & Tucker, LLP; Ravi Mohan; Marc A. McClain

(57) ABSTRACT

Devices, systems, methods, and processes for facilitating a first-time user experience for a workload protection solution are described herein. This can be done through a segmentation setup assistant that can be configured to gather data related to a network and generate one or more prompts for a user to input data related to the network. This data can be associated with a network's organization, infrastructure, environment, and the like. For example, providing various internet protocol addresses and subnets related to different network devices, data centers, and applications can be utilized to generate an automated hierarchy and/or suggestions on how to properly segment and setup a network for workload protection. In this way, a user may be able to configure the system via the setup assistant and thus be more apt to correctly setup a network with a workload protection solution and provide a more optimal security outcome.

20 Claims, 8 Drawing Sheets

(56) References Cited

OTHER PUBLICATIONS

Ma M., et al., "Automatic Generation of Network Micro-Segmentation Policies for Cloud Environments", 2023 4th International Seminar on Artificial Intelligence, Networking and Information Technology (AINIT), IEEE, Jun. 16, 2023, pp. 1-5, XP034403391, DOI: 10.1109/AINIT59027.2023.10212857, abstract, section "IV. Micro-Segmentation Scheme", p. 2, col. 1—p.3, col. 1.

Wang J., et al., "Network Meets ChatGPT: Intent Autonomous Management, Control and Operation", Journal of Communications and Information Networks, vol. 8, No. 3, Sep. 1, 2023, pp. 239-255, XP093172509, ISSN: 2096-1081, DOI: 10.23919/JCIN.2023. 10272352, Retrieved from https://ieeexplore.ieee.org/document/10272352, abstract section "IV. NETLM", p. 244-p. 246, section "D. Troubleshooting and Network Automation", p. 253.

Weldon D., "How ChatGPT can assist with Network Management", TechTarg, Apr. 26, 2023, pp. 1-6, XP093247689, Retrieved from https://www.techtarget.com/searchnetworking/feature/How-ChatGPT-can-assist-with-network-management, The whole document.

* cited by examiner

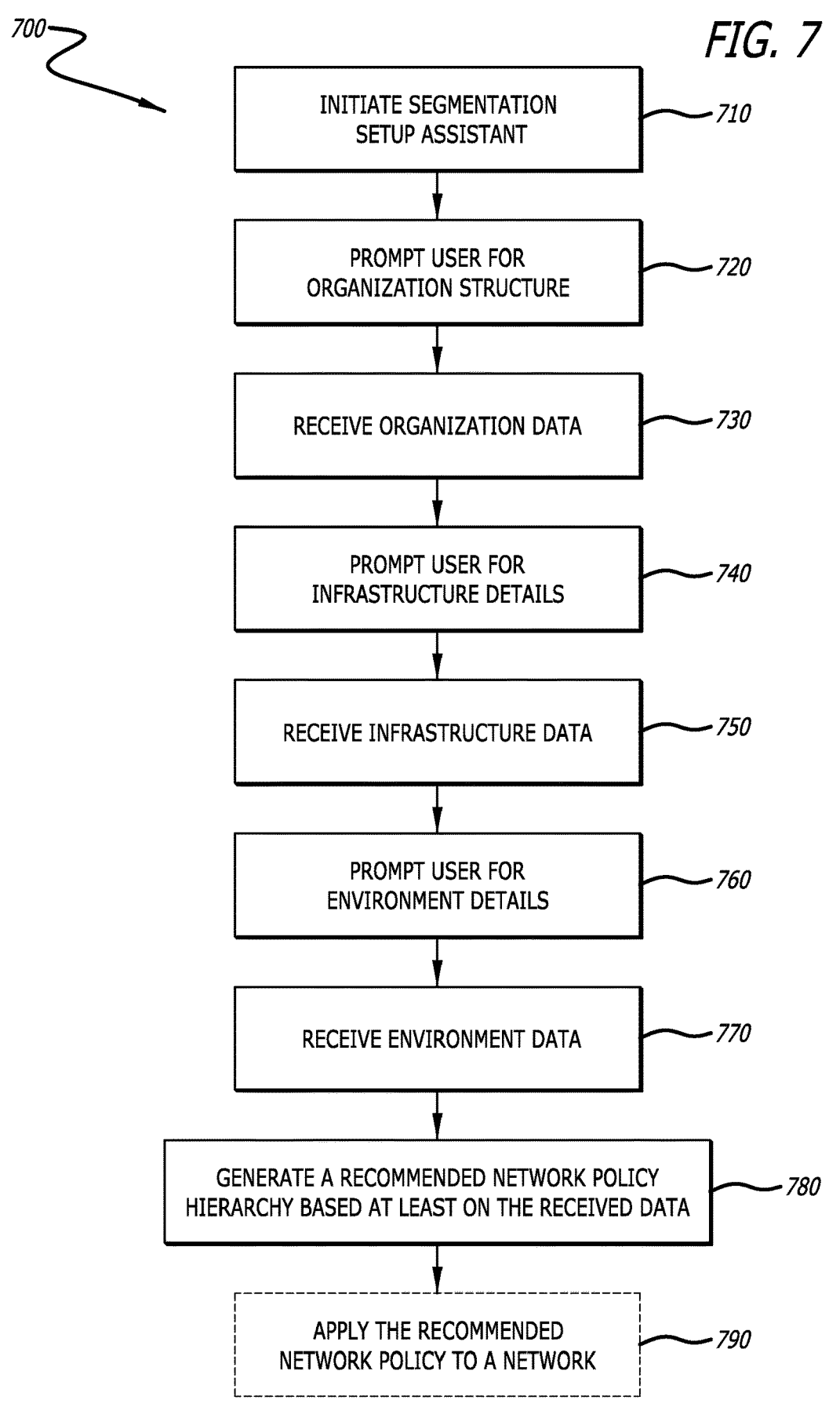

INITIATE SEGMENTATION
SETUP ASSISTANT — *710*

PROMPT USER FOR
ORGANIZATION STRUCTURE — *720*

RECEIVE ORGANIZATION DATA — *730*

PROMPT USER FOR
INFRASTRUCTURE DETAILS — *740*

RECEIVE INFRASTRUCTURE DATA — *750*

PROMPT USER FOR
ENVIRONMENT DETAILS — *760*

RECEIVE ENVIRONMENT DATA — *770*

GENERATE A RECOMMENDED NETWORK POLICY
HIERARCHY BASED AT LEAST ON THE RECEIVED DATA — *780*

APPLY THE RECOMMENDED
NETWORK POLICY TO A NETWORK — *790*

FIRST-TIME USER EXPERIENCE SYSTEMS AND METHODS FOR WORKLOAD PROTECTION SOLUTIONS

The present disclosure relates to networking. More particularly, the present disclosure relates to facilitating a segmentation setup assistant for a first-time user of a workload protection solution.

BACKGROUND

Software applications have become critically important for organizations worldwide, serving as the lifeblood of their operations. Applications not only drive revenue but also engage customers, facilitate business outcomes, and differentiate organizations from their competitors. Developers, as the creators of these applications, play a central role in business transformation and are valued customers of enterprise IT. IT operators, including networking professionals, provide business value by supporting applications with agility and efficiency.

Developers are deploying applications in multiple public and private clouds, often alongside legacy applications in various data centers. The rise of microservices is also contributing to the development of highly distributed application environments, with application tiers and data services spread across data centers and public clouds. However, outdated protocols and tools have failed to keep up with these dynamic application environments, leading to challenges in monitoring and ensuring application availability and performance.

Addressing these challenges can lead to better network performance and reliability. In response, workload protection solutions offer machine learning capabilities that provide actionable insights into network performance. They can enhance network visibility, supports mission-critical applications in both on-premises data centers and the public cloud, and offers comprehensive traffic telemetry information. The platform performs advanced analytics and tracks network topology, making it easier for operations teams to manage and optimize network performance for digital business and cloud infrastructures. Such a holistic approach to protect data centers and workloads across multiple cloud environments can be achieved, in part, by implementing segmentation, zero-trust models, and automated compliance enforcement.

However, many users of workload protection solutions are not versed on how to properly set up and determine appropriate segmentation across their network. This may require a user to have knowledge of multiple product disciplines, and leave them uncertain of where to begin to setup a network for workload protection. As a result, the segmentation may be applied using different techniques and often drive or result in different outcomes.

SUMMARY OF THE DISCLOSURE

Systems and methods for automatically identifying and classifying network traffic to generate a recommended policy in accordance with embodiments of the disclosure are described herein. In some embodiments, a device includes a processor, at least one network interface controller configured to provide access to a network, and a memory communicatively coupled to the processor, wherein the memory includes a workload protection logic. The logic is configured to initiate a segmentation setup assistant, deploy a plurality of agents, receive user input data, and generate a recommended network policy.

In some embodiments, the plurality of agents are deployed on the network.

In some embodiments, the workload protection logic is further configured to determine a desired type of agent to install.

In some embodiments, the workload protection logic is further configured to determine a desired version of agent to install.

In some embodiments, the user input data includes at least groupings of workloads.

In some embodiments, the user input data includes at least a definition of at least one internet protocol address associated with the network.

In some embodiments, the user input data includes at least a definition of at least one subnet associated with the network.

In some embodiments, the user input data includes at least a definition of both public and private internet protocol address ranges associated with the network.

In some embodiments, the recommended network policy includes at least a label associated with each data center.

In some embodiments, each data center is assigned a key and value pair.

In some embodiments, the recommended network policy includes a recommended scope design.

In some embodiments, the recommended network policy includes a recommended label design.

In some embodiments, workload protection logic is further configured to generate a prompt or user input.

In some embodiments, the prompt is a graphical user interface configured to show a hierarchal structure of the network.

In some embodiments, the graphical user interface is further configured to receive scope data.

In some embodiments, the recommended network policy includes at least a segmented network hierarchy.

In some embodiments, the recommended network policy is based on at least the user input data and data received from at least one of the plurality of agents.

In some embodiments, a device includes a processor, at least one network interface controller configured to provide access to a network, and a memory communicatively coupled to the processor, wherein the memory includes a workload protection logic. The logic is configured to receive a request to initiate network segmentation, determine one or more suitable agent types for the network, deploy a plurality of the suitable agents, generate a graphical user interface prompt configured to receive user input, receive user input data from the prompt, and generate at least one recommended network segmentation.

In some embodiments, the at least one recommended network segmentation is based on at least the user input data and data received from at least one of the deployed agents.

In some embodiments, a method generates an application dependency mapping, including receiving a request to initiate network segmentation, determining one or more suitable agent types for the network, deploying a plurality of the suitable agents, generating a graphical user interface prompt configured to receive user input, receiving user input data from the prompt, and generating at least one recommended network segmentation.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 7 is a flowchart depicting a more-detailed process for applying a recommended network policy generated from a segmentation setup assistant in accordance with various embodiments of the disclosure.

Figure 1:
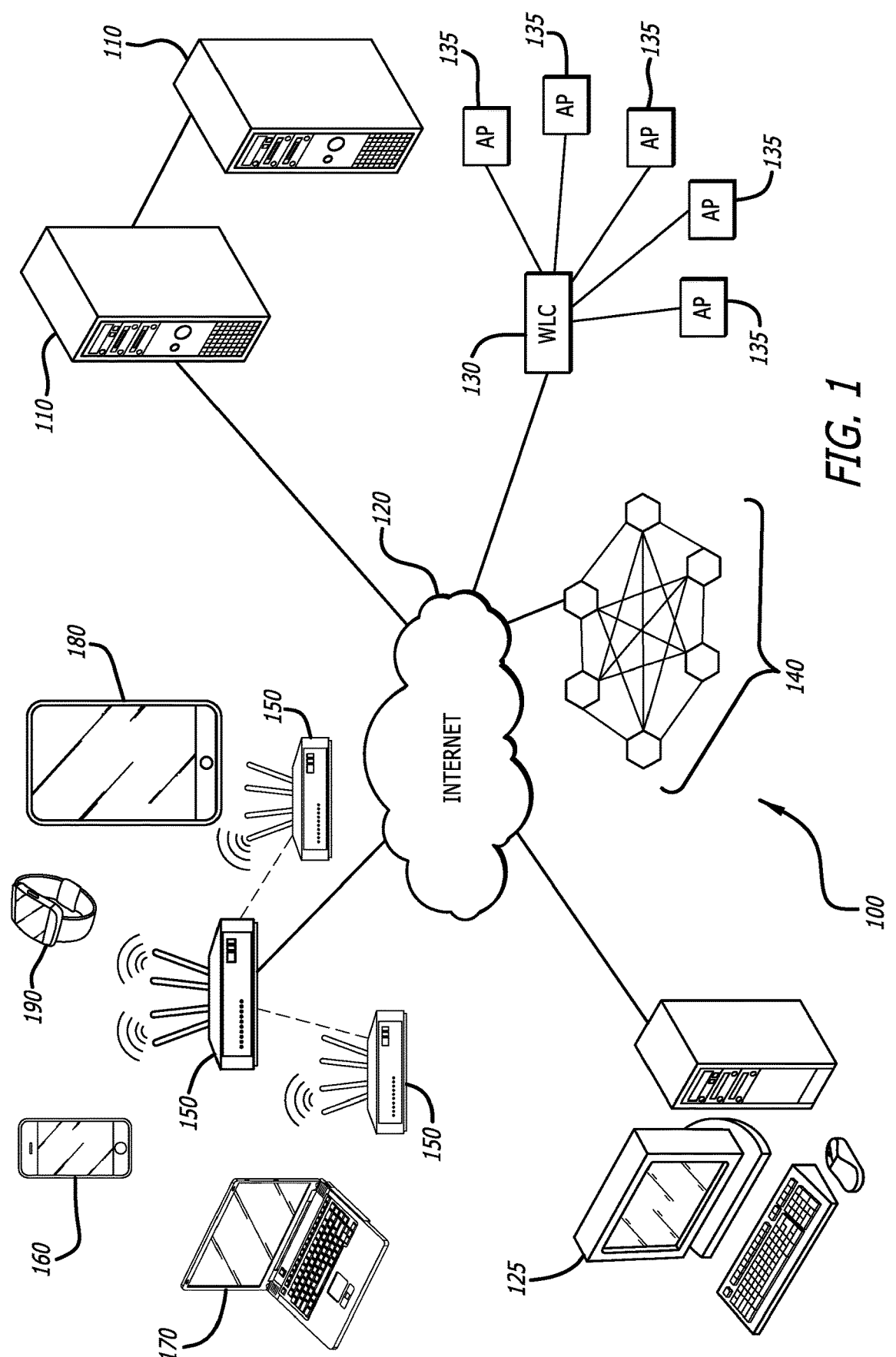
FIG. 1 is a conceptual network diagram of various environments that a workload protection logic may operate within in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can assist with setting up a network for workload protection through a first-time user experience which can be a realized through a segmentation setup assistant or other similar series of prompts. By utilizing these methods and systems, a workflow can be realized that allows users to focus on the outcome while the workload protection solution can suggest a consistent approach to a policy hierarchy that is consistent with the product intentions.

In many embodiments, the first-time user experience workflow can be configured to specifically walk a user through a series of prompts by asking very pointed questions that can allow the workload protection solution to discover workflow behavior and recommend policies. This workflow can start with the highest level of the policy hierarchy and continue to the more specific aspects to recommend a consistent approach for the workload protection solution to design scopes and labels. As discussed in more detail below, scopes and labels are a workload protection solution technology that can allow users to define policy- and role-based access that accounts for usage and context during the application life cycle. Users can often get consumed with creating an optimal scope and label design that it ends up being an operational challenge to maintain this setup.

In a number of embodiments, the workload protection solution can deploy a plurality of agents across the network. These agents can vary in type and version and can be selected based on the specific characteristics of the network deployment. The workload protection solution can be configured to automatically determine a particular version or type of agent to deploy. These agents can be utilized to provide various data that can be used in generating prompts for the user to interact with and enter user data related with the network. In response to various prompts, the user may input data related to a variety of network aspects. These prompts may be configured within a graphical user interface, which may be further configured to show a hierarchal structure of the network. In certain embodiments, the user input data can comprise at least groupings of workloads, definitions of internet protocol (IP) address, subnets, public and private IP address ranges associated with the network, data centers, etc.

In response to the prompts generated by the first-time user experience methods and systems, the result may be one or more recommended network policies. These network policies may include a label for each data center, scope design, label design, key/value pairs, segmentation, network hierarchy, etc. The recommended network policies may be generated at least in part from the user input data provided and/or data received from the plurality of agents deployed across the network.

The request to initiate a first-time user experience, segmentation setup assistant, or the like can be in response to an initial execution of the workload protection software. However, it is contemplated that such a process or method may also be implemented in response to an event, such as a change in network configuration, etc. In some embodiments, a user may request to re-run the first-time user experience, triggering a manual execution.

Workload Protection Solutions

In many embodiments, a workload protection solution offers a holistic approach to protect data centers across multiple cloud environments by implementing a zero-trust model through segmentation. This approach helps in faster detection of security incidents, containment of lateral movement, and reduction of the attack surface. Workload protection solutions are often infrastructure-agnostic and support on-premises as well as public cloud workloads. These solutions can provide capabilities like automated "allow list" policy generation based on real-time telemetry data, enforcing a zero-trust model, identifying process behavior deviations, and detecting software vulnerabilities. These workload protection solutions can be deployed in numerous way including, but not limited to, appliance-based, virtual, and Software as a Service ("SaaS") deployment solutions.

Workloads

In the context of various network infrastructures, a "workload" typically refers to a unit of work or a specific set of tasks that a computing system, server, or other network device is responsible for executing. In some environments, the term "workload" may be hosts that have a Secure Workload Agent ("SWA") installed while hosts that do not have a SWA installed on them can be considered "IP addresses".

Workloads can vary widely and encompass various types of applications and services, including application workloads like web applications and databases, virtualization workloads represented by virtual machines or containers in virtualized environments, data workloads related to data processing and storage tasks, network workloads associated with network services and data transmission, security workloads for services like firewalls and encryption, and storage workloads concerning data storage and management. Workload protection solutions can secure these various workloads in data centers, cloud environments, and network infrastructures. Understanding and efficiently securing various workloads is often considered essential for optimizing resource utilization and ensuring the performance, and reliability of IT systems.

Segmentation

In networking, "segmentation" often refers to the strategic practice of dividing a network into smaller, isolated segments or subnetworks. Workload protection solutions can utilize segmentation to achieve several critical objectives. Firstly, it bolsters network security by isolating different segments from one another, safeguarding against the potential fallout of a security breach in one segment from affecting the entire network. These segmentation solutions can enforce security policies and regulate traffic flow between segments to prevent unauthorized access and data breaches.

Secondly, segmentation can often simplify network management. By breaking down a large network into more manageable parts, administrators can apply specific policies, monitor network traffic, and troubleshoot issues more effectively within each isolated segment. Additionally, network performance can benefit from segmentation as it reduces congestion and contention for network resources, ultimately enhancing the performance of critical applications and services. Workload protection solutions can be configured to implement network segmentation and micro-segmentation. These tools empower organizations to create, manage, and maintain network segments efficiently, contributing to a more secure, manageable, and streamlined network infrastructure.

Zero-Trust

Also, in the realm of networking, "zero-trust" typically represents a security paradigm that fundamentally challenges the traditional notion of trust within network environments. This model can operate on the premise that no entity, whether situated inside or outside the network, should be automatically trusted. Instead, it mandates stringent access controls and continuous validation procedures. Entities, including users, devices, and applications, are required to authenticate their identity and demonstrate their security posture before being granted access to network resources. This approach aims to fortify network security by eliminating assumptions of trust and significantly reducing the risk of unauthorized access or breaches.

Zero trust principles encompass several key tenets. Firstly, identity verification is a prerequisite for access, necessitating robust authentication methods like multi-factor authentication ("MFA"). Secondly, access rights are strictly governed by the principle of least privilege, limiting permissions to the bare minimum essential for entities to perform their designated functions. Micro-segmentation can be employed to isolate and secure network segments, ensuring rigorous controls on traffic flow and minimizing the potential attack surface. Continuous monitoring of network traffic and entity behavior is paramount to promptly detect and respond to anomalies or security threats.

Lastly, encryption is often widely adopted to safeguard data, whether in transit or at rest. This comprehensive zero trust model can address the evolving threat landscape, acknowledging the presence of potential threats both within and outside the network. It is designed to enhance data and resource security, regardless of their location, in recognition that traditional perimeter-based security approaches are no longer adequate in today's complex and dynamic network environments. Workload protection solutions can be configured to provide solutions to implement a zero-trust security model effectively.

Scopes

Scopes serve as a fundamental component in configuring and establishing policies within a workload protection solution. Scopes can be considered as collections of workloads organized in a hierarchical structure. Workloads can be labeled with attributes that provide insights into their location, role, and/or function in the environment. Often, the purpose of scopes is to offer a framework for dynamic mechanisms, particularly in terms of identification and attributes associated with changing IP addresses.

Scopes may also be primarily utilized for grouping datacenter applications and, when combined with roles, they enable precise control over the management of these applications. For instance, scopes play a pivotal role in defining access to policies, flows, and filters throughout the product. These scopes can be structured hierarchically, forming sets of trees with the root representing, for example, a Virtual Routing and Forwarding (VRF). Each scope tree hierarchy can represent distinct data that does not overlap with others. When defining individual scopes, key attributes can include the parent scope, name (for identification), type (for specifying different categories of inventory), and a query (that can define the individual scope). Often, it may be desired to organize one or more scopes hierarchically to mirror the application ownership hierarchy within the organization.

These scopes are often instrumental in constructing a hierarchical map of your network, which can be referred to as a "scope tree." This hierarchical representation is essential for efficiently establishing and maintaining network policies. For example, utilizing a scope tree can enable the creation of a policy that can be automatically applied to every workload within a specific branch of that tree. Additionally, a scope tree can facilitate the delegation of responsibility for managing certain applications or network segments to individuals with the necessary expertise to define the appropriate policies for those workloads.

Labels

Labels can play a crucial role in defining logical policies within a managed network. By way of non-limiting example, labels can be configured to enable the creation of policies like "allow traffic from "consumer network applications" to "provider database"." Rather than specifying the exact members of the consumer and provider workload groups, these logical policies can be formulated using labels, providing flexibility in dynamically modifying the membership of these groups without altering the policy. Workload protection solutions can receive notifications from configured services, such as external orchestrators and cloud connectors, when workloads are added or removed. This may allow the workload protection solution to continually assess the composition of groups like "consumer network applications" and "provider database" to ensure accurate policy enforcement. Additionally, subnet-based label inheritance is supported, which can allow smaller subnets and IP addresses to inherit labels from larger subnets they belong to. This inheritance can occur when labels are either missing from the smaller subnet/address or when the label value for the smaller subnet/address is empty, enhancing the efficiency and consistency of label management.

Agents

As those skilled in the art will recognize, a software agent or "agent" typically refers to a specialized and autonomous program or script that is designed to perform tasks or make decisions on behalf of a user, system, or organization. These agents can range from simple to highly complex and are often used to automate tasks, gather, and analyze data, and/or interact with other software systems and users. They can act on predefined rules and logic or adapt and learn from their environment. Software agents are used in various applications, including network management, artificial intelligence, data mining, and automation of routine tasks. They can be configured to allow software components to act independently or collaboratively to achieve specific goals.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual network diagram of various environments that a workload protection logic may operate within in accordance with various embodiments of the disclosure is shown. Those skilled in the art will recognize that a workload protection logic can be comprised of various hardware and/or software deployments and can be configured in a variety of ways. In some non-limiting examples, the workload protection logic can be configured as a standalone device, exist as a logic within another network device, be distributed among various network devices operating in tandem, or remotely operated as part of a cloud-based network management tool.

In many embodiments, the network 100 may comprise a plurality of devices that are configured to transmit and receive data for a plurality of clients. In various embodiments, cloud-based centralized management servers 80 are connected to a wide-area network such as, for example, the Internet 80. In further embodiments, cloud-based centralized management servers 80 can be configured with or otherwise operate a workload protection logic. The workload protection logic can be provided as a cloud-based service that can service remote networks, such as, but not limited to the deployed network 140. In these embodiments, the workload protection logic can be a logic that receives data from the deployed network 140 and generates predictions, receives environmental sensor signal data, and perhaps automates certain decisions or protective actions associated with the network devices. In certain embodiments, the workload protection logic can generate historical and/or algorithmic data in various embodiments and transmit that back to one or more network devices within the deployed network 140.

However, in additional embodiments, the workload protection logic may be operated as distributed logic across multiple network devices. In the embodiment depicted in FIG. 1, a plurality of network access points (APs) 150 can operate as a workload protection logic in a distributed manner or may have one specific device facilitate the detection of movement for the various APs. This can be done to provide sufficient needs to the network of APs such that, for example, a minimum bandwidth capacity may be available to various devices. These devices may include but are not limited to mobile computing devices including laptop computers 170, cellular phones 160, portable tablet computers 180 and wearable computing devices 190.

In still further embodiments, the workload protection logic may be integrated within another network device. In the embodiment depicted in FIG. 1, the wireless LAN controller 130 may have an integrated workload protection logic that it can use to generate predictions, and perhaps detect anomalous movements regarding the various APs 135 that it is connected to, either wired or wirelessly. In this way, the APs 135 can be configured such that they can read and report various signal levels and environmental sensor signals to the WLC 130. In still more embodiments, a personal computer 85 may be utilized to access and/or manage various aspects of the workload protection logic, either remotely or within the network itself. In the embodiment depicted in FIG. 1, the personal computer 85 communicates over the Internet 80 and can access the workload protection logic within the cloud based centralized management servers 80, the network APs 150, or the WLC 130 to modify or otherwise monitor the workload protection logic.

Although a specific embodiment for a conceptual network diagram of a various environments that a workload protection logic operating on a plurality of network devices suitable for carrying out the various steps, processes, methods, and operations described herein is discussed with respect to FIG. 1, any of a variety of systems and/or processes may be utilized in accordance with embodiments of the disclosure. For example, the workload protection logic may be implemented across a variety of the systems described herein such that some detections are generated on a first system type (e.g., remotely), while additional detection steps or protection actions are generated or determined in a second system type (e.g., locally). The elements depicted in FIG. 1 may also be interchangeable with other elements of FIGS. 1-2, and 4-8 as required to realize a particularly desired embodiment.

Figure 2:
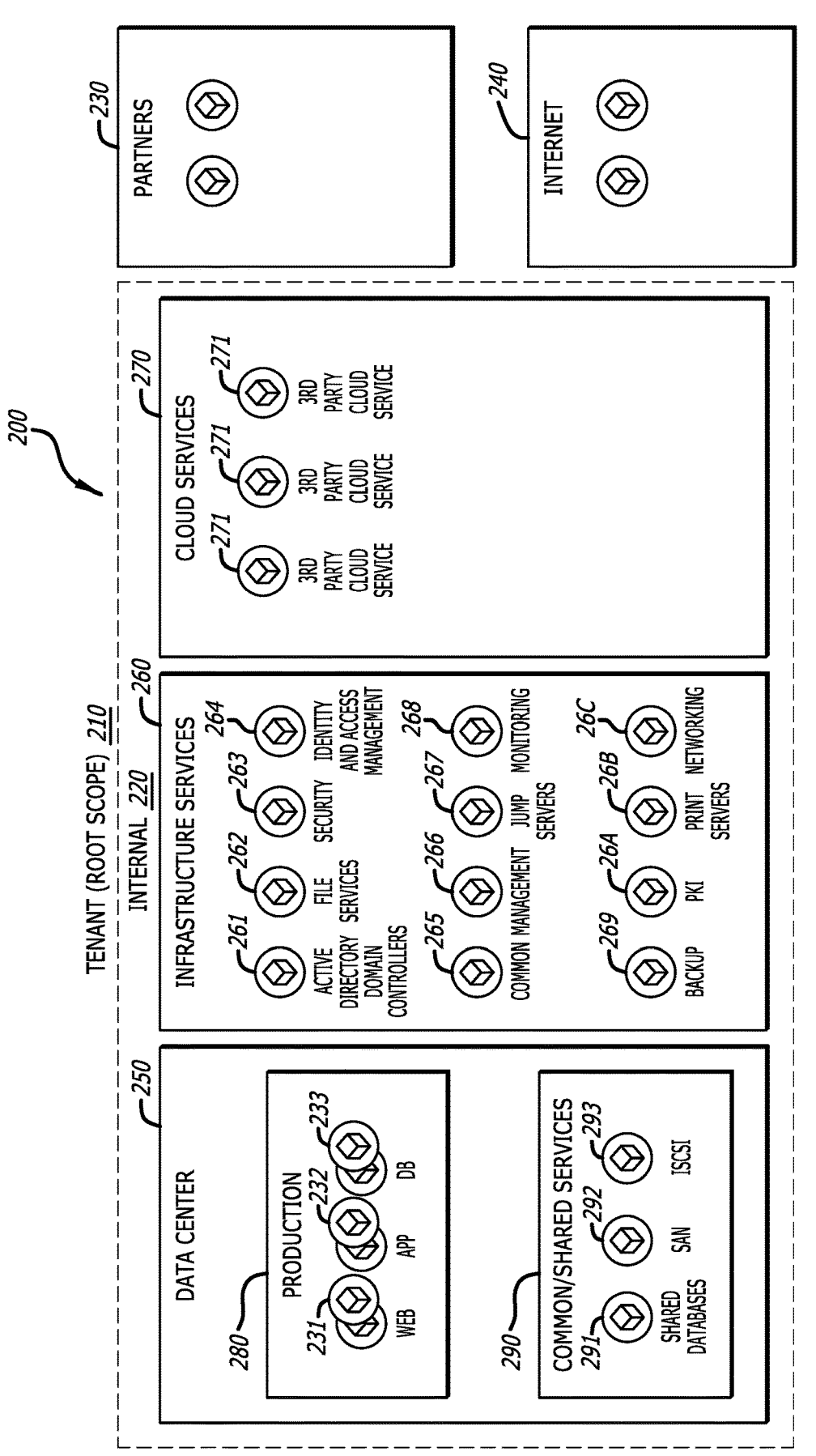
FIG. 2 is a conceptual illustration of a segmentation model within a workload protection system in accordance with various embodiments of the disclosure.

Referring to FIG. 2, a conceptual illustration of a segmentation model within a workload protection system in accordance with various embodiments of the disclosure is shown. As discussed above, segmentation can be utilized as a strategic dividing of a network into smaller, isolated segments or sub-networks. This segmentation can be applied to networks of various sizes and configurations. The embodiment depicted in FIG. 2 is a network 200 that is segmented into various segments.

In many embodiments, the network 200 can have a tenant or root scope 210 that encompasses all other segments. Within the root scope 210, an internal scope 220 and various external scopes can be segmented. In the embodiment depicted in FIG. 2, the external scopes include a partner segment 230 and an Internet segment 240. As discussed in more detail below, the external scopes and/or segments can include various services and databases.

In a number of embodiments, the internal scope 220 can include a number of segments. In the embodiment depicted in FIG. 2, the internal scope 220 includes a data center segment 250, an infrastructure services segment 260, and a cloud services segment 270. The data center segment 250 can itself comprise a production segment 280 and a common/shared services segment 290.

In some embodiments, the infrastructure services can include a plurality of segments. The embodiment depicted in FIG. 2 includes various segments such as an active directory domain controller segment 261, a file services segment 262, a security segment 263, an identity and access management segment 264, a common segment 265, a management segment 266, a jump services segment 267, a monitoring segment 268, a backup segment 269, a PKI segment 26A, a print servers segment 26B, and a networking segment 26C. As those skilled in the art will recognize, the number, amount, variety, and size of the segments in a scope can vary depending on the application desired.

Similarly, in various embodiments, the cloud services segment 270 can include a plurality of various third-party cloud services 271. Those skilled in the art will recognize that different cloud-based services can be incorporated based on the specific need. Likewise, additional embodiments may include a production segment 280 comprising a web segment 281, an app segment 282, and a database segment 283 (shown "DB"). In still more embodiments, a common/shared services segment 290 may comprise a shared databases segment 291, a SAN segment 292, and an ISCSI segment 293. Each of these segments can provide an additional layer of security and overall workload protection within a network.

Although a specific embodiment for a conceptual illustration of a segmentation model within a workload protection system suitable for carrying out the various steps, processes, methods, and operations described herein is discussed with respect to FIG. 2, any of a variety of systems and/or processes may be utilized in accordance with embodiments of the disclosure. For example, the segmentation can comprise more or fewer scopes as needed based on the desired application and each various devices associated with a particular segment may be redeployed to a new scope as needed. The scopes may be dynamically assigned. The elements depicted in FIG. 2 may also be interchangeable with other elements of FIGS. 1 and 3-8 as required to realize a particularly desired embodiment.

Figure 3:
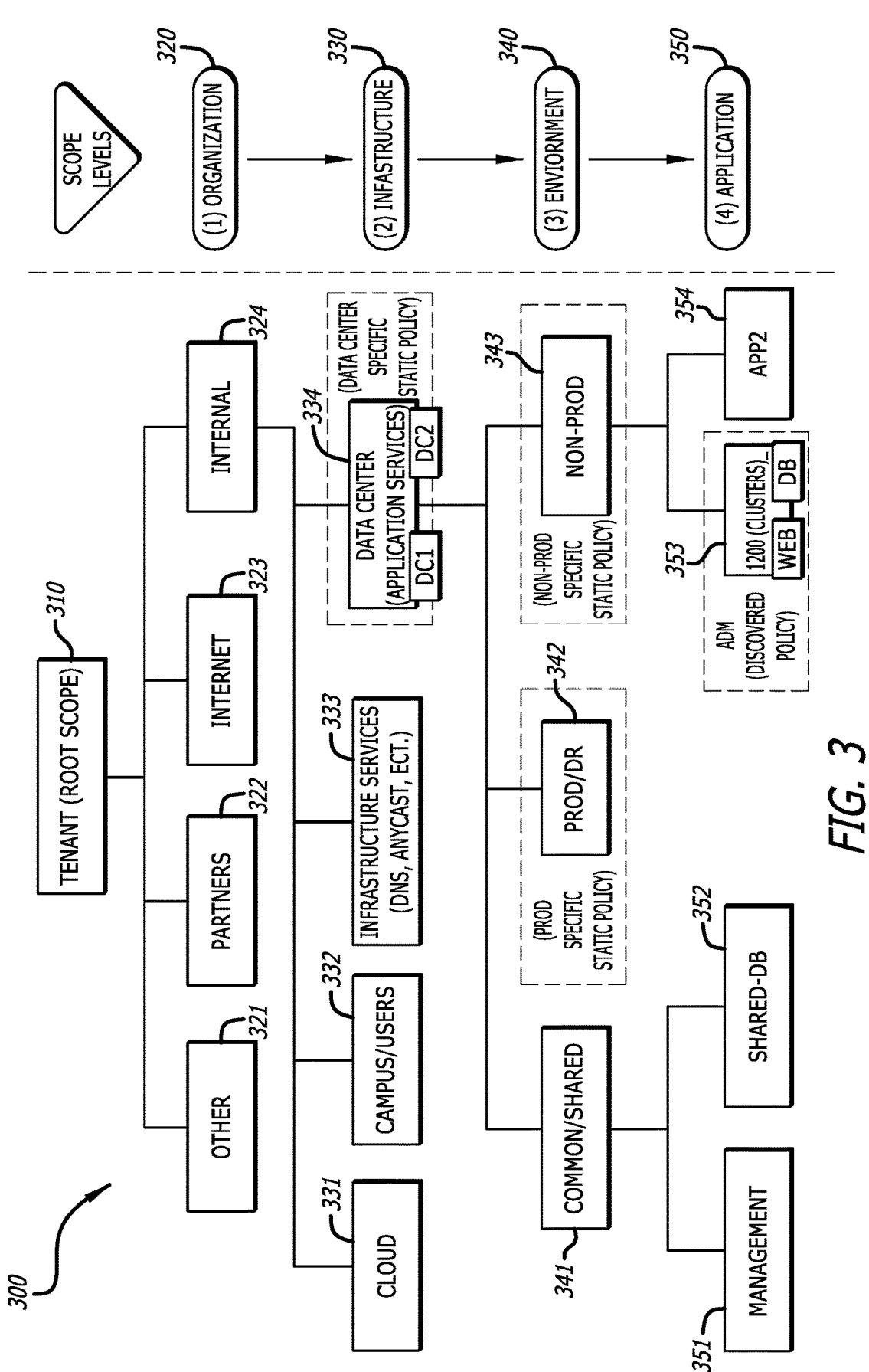
FIG. 3 is a conceptual hierarchal scope design within a workload protection system in accordance with various embodiments of the disclosure.

Referring to FIG. 3, a conceptual hierarchal scope design 300 within a workload protection system in accordance with various embodiments of the disclosure is shown. As discussed above, scopes can be configured as a collection of workloads that are organized in a hierarchal fashion. The embodiment depicted in FIG. 3 is a hierarchal scope design 300 that has an organization scope level 320, an infrastructure scope level 330, an environment scope level 340, and an application scope level 350. Each of these scope levels can be associated with a plurality of segments, applications, workloads, etc. Typically, however, each scope is nested within a tenant or root scope 310.

In the organization scope level 320, the embodiment depicted in FIG. 3 comprises an "other" segment 321, a partners segment 322, an Internet segment 323, and an internal segment 324. Each of these segments 321-324 is a child of the root scope 310. In some embodiments, the internal segment 324 can comprise a plurality of children segments that are associated with a different scope level. In the embodiment depicted in FIG. 3, the internal segment 324 has multiple children segments 331-334 that are associated with the infrastructure scope level 330. These children segments include a cloud segment 331 which can be associated with a plurality of third-party cloud-based services, a campus/users segment 332, an infrastructure services segment 323 (which is shown as including services such as, but not limited to, dynamic naming service, Anycast, and the like). The infrastructure scope level 330 may also include a data center segment 334 that can have a specific scope policy that is associated with one or more data centers such as a first data center (shown as "DC1") and a second data center (shown as "DC2") in the embodiment depicted in FIG. 3.

In further embodiments, an environment scope level 340 can be associated with a plurality of segments. In the embodiment depicted in FIG. 3, a common/shared segment 341, a production/DR segment 342, and a non-production segment 343 (shown as "Non-Prod") is associated with the environment scope level 340. Both the production/DR segment 342, and the non-production segment 343 can have a specific statis policy associated with each of them. Each of these segments 341-343 is depicted as being a child parent of the data center segment 334.

In more embodiments, the application scope level 350 can be associated with segments that are children of segments within the environment scope level 340. In the embodiment depicted in FIG. 3, the common/shared segment 341 has two children segments as a management segment 351 and a shared database segment 352 (shown as "Shared-DB"). Likewise, the nonproduction segment 343 can have two children segments in a cluster segment 353 (shown as "1200 (clusters) . . . ), and a second application scope 354 (shown as "APP2"). Furthermore, within the cluster segment 353, specific web or database services (shown as "DB") can be associated with the segment that has an application dependency map applied as a discovered policy (shown as "ADM"). This hierarchal nature can aid a network or system administrator to visualize and understand relationships between various segments, allowing for more efficient application of network policies, providing increased network security.

Although a specific embodiment for a conceptual hierarchal scope design within a workload protection system suitable for carrying out the various steps, processes, methods, and operations described herein is discussed with respect to FIG. 3, any of a variety of systems and/or processes may be utilized in accordance with embodiments of the disclosure. For example, scope may vary depending on the size of the network or the application desired. Additionally, the scope may change based on one or more events or user input. The elements depicted in FIG. 3 may also be interchangeable with other elements of FIGS. 1-2 and 4-8 as required to realize a particularly desired embodiment.

Figure 4:
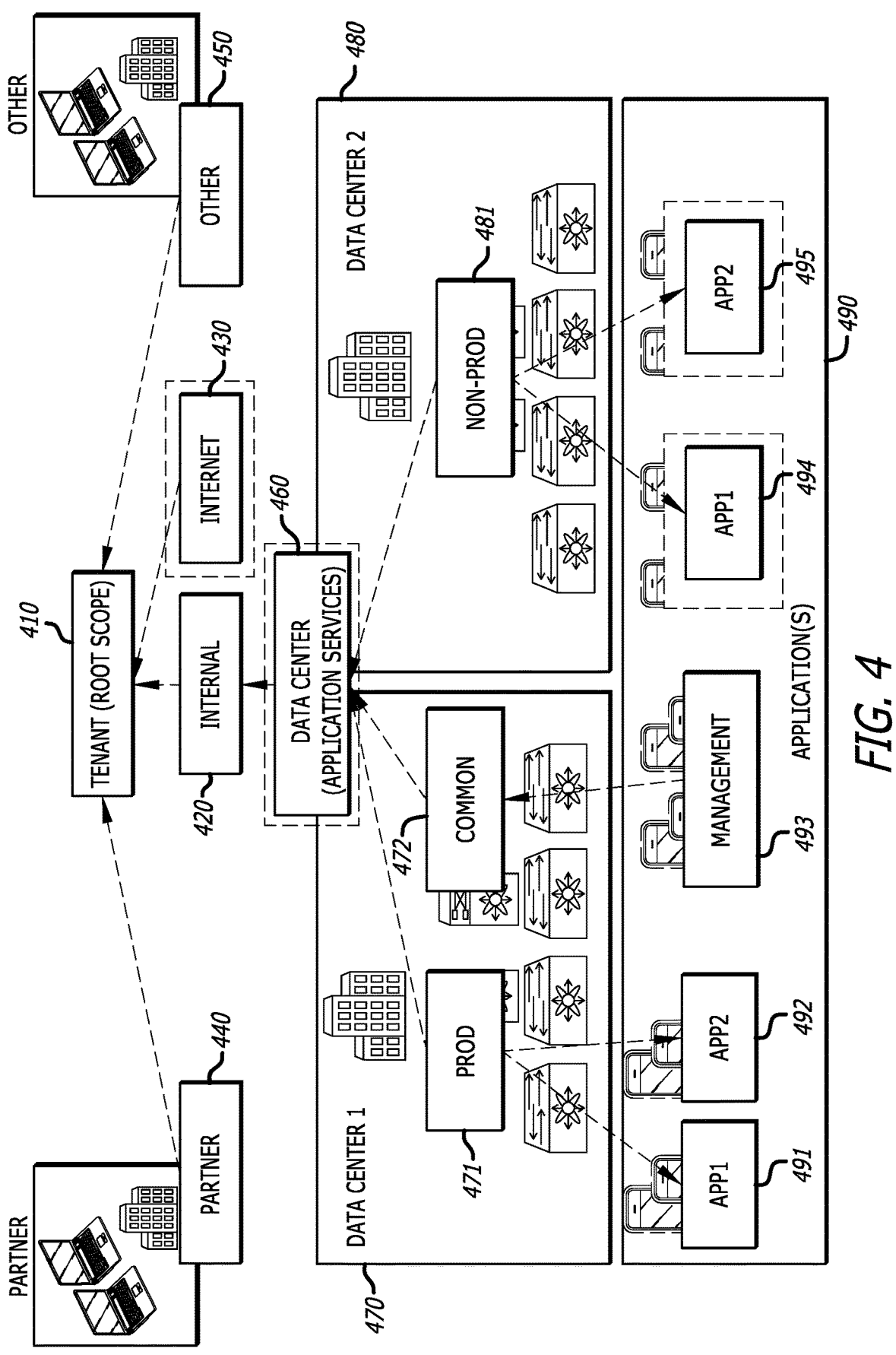
FIG. 4 is a conceptual illustration of a network topology operating with a workload protection system in accordance with various embodiments of the disclosure.

Referring to FIG. 4, a conceptual illustration of a network topology 400 operating with a workload protection system in accordance with various embodiments of the disclosure is shown. In many embodiments, the network topology 400 can include a tenant or root scope 410 which is connected to both a partner segment 440 and other segment 450 which can be external network segments. Conversely, the topology 400 can include an internal segment 420 and an Internet segment 430 that are also connected to the root scope 410.

In various embodiments, a data center segment 460 can include a plurality of data center segments. In the embodiment depicted in FIG. 4, there is a first data center segment 470 (shown as "data center 1") and a second data center segment 480 (shown as "data center 2"). The first data center segment 470 can include a production segment 471 (shown as "PROD") and a common segment 472. Each of these segments are children of the data center segment 460. Similarly, the second data center segment 480 can include a non-production segment 481 (shown as "Non-PROD"), which is also a child of the parent data center segment 460. As those skilled in the art will recognize, the number of segments and/or data centers that can be including within a topology 400 can vary based on the desired application or deployment.

In more embodiments, the topology 400 can include an application segment 490 that can include various sub-segments. In the embodiment depicted in FIG. 4, the application segment 490 includes a first application segment 491 (shown as "APP1") and a second application segment 492 (shown as "APP2") as well as a management segment 493. Each of these segments 491-493 are children of the first data center segment 470. Specifically, the first application segment 491 and second application segment 492 are children of the parent production segment 471, while the management segment 493 is a child of the parent common segment 472. Similarly, an additional series of non-production applications can be within the application segment 490. In the embodiment depicted in FIG. 4, a third application 494 (shown as "APP3") and a fourth application 495 (shown as "APP4").

Each of these segments, as shown in the topology 400 can allow for unique policy applications that can keep the overall network more secure. As those skilled in the art will recognize, the embodiments depicted in FIGS. 2-4 are all various ways to organize, visualize, or otherwise establish a segmentation strategy for a network. Each method of laying out a segmentation strategy can provide different views or aspects that can help address any issues or remaining portions of the network that still require segmentation or securing.

Although a specific embodiment for a conceptual illustration of a network topology operating with a workload protection system suitable for carrying out the various steps, processes, methods, and operations described herein is discussed with respect to FIG. 4, any of a variety of systems and/or processes may be utilized in accordance with embodiments of the disclosure. For example, specific layout of the topology 400 can vary greatly depending on the specific network being protected. The elements depicted in FIG. 4 may also be interchangeable with other elements of FIGS. 1-3 and 5-8 as required to realize a particularly desired embodiment.

Figure 5:
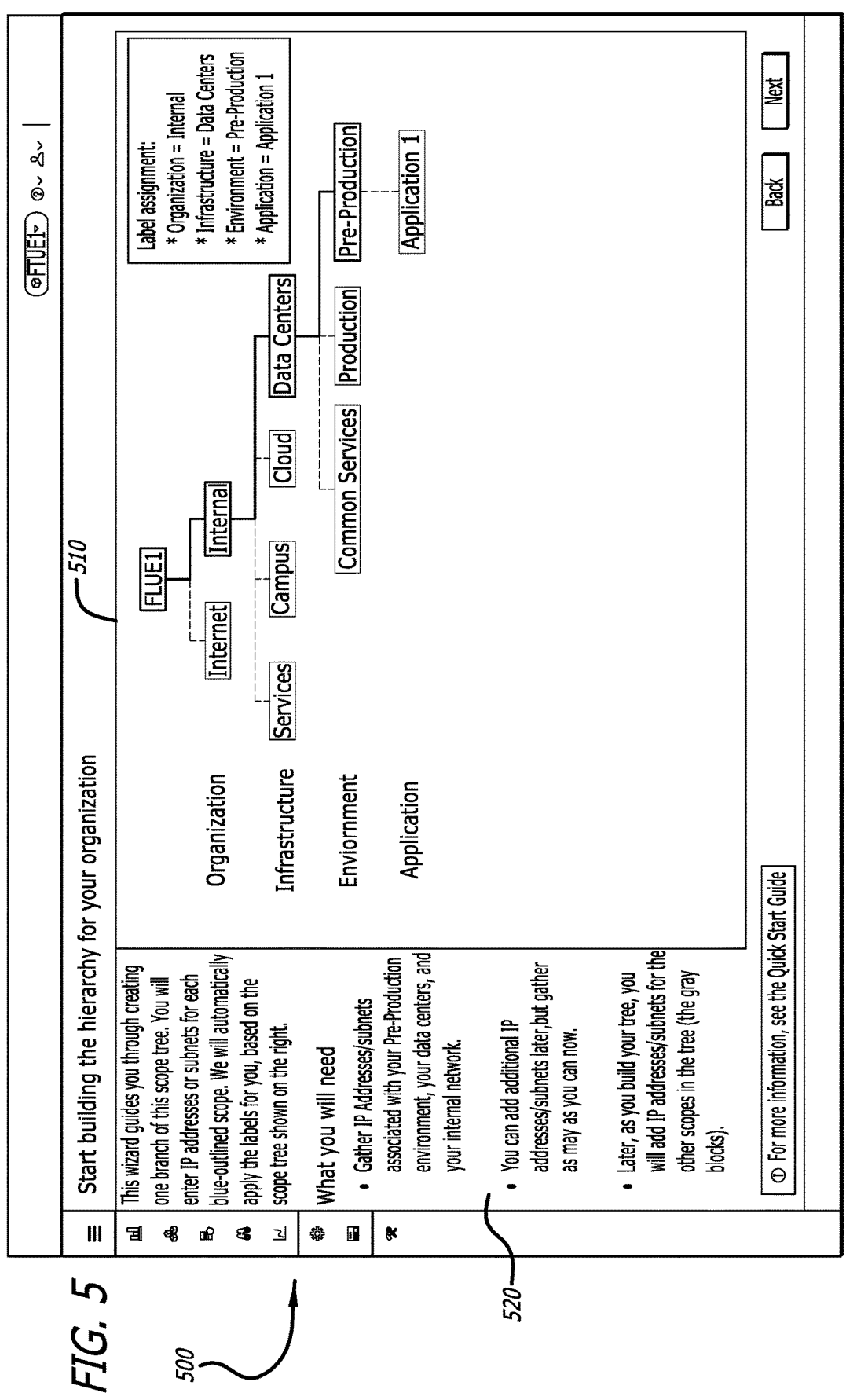
FIG. 5 is a conceptual illustration of a first-time user interface with a graphical representation of a network hierarchy in accordance with various embodiments of the disclosure.

Referring to FIG. 5, a conceptual illustration of a first-time user interface 500 with a graphical representation of a network hierarchy in accordance with various embodiments of the disclosure. In many embodiments a first-time user interface 500 can be a segmentation setup assistant. This assistant can be executed by a user initiating the first-time user interface 500 or as a step in the initial setup of the workload protection service.

As shown in the embodiment depicted in FIG. 5, the first-time user interface 500 can include a hierarchal view 510 of the network. This hierarchal view 510 can lay out a plurality of scopes, and/or labels which can be associated with one or more segments of a network that can be configured to protect various workloads. This hierarch view 510 can allow a user to visualize the current setup of the network on various levels. The first-time user interface 500 can also include a sidebar 520 which can provide textual feedback and/or instructions to a user while they are setting up the hierarchal view 510.

However, as those skilled in the art will recognize, the actual layout of the first-time user interface 500 can be adjusted based on the application desired. The specific location of views, interface buttons, textual prompts, and/or other components of the first-time user interface 500 can be moved, added, or extracted as needed. The first-time user interface 500 can be delivered via a workload protection logic, or can be part of a specific client application, web-based application, mobile device application, or the like.

Although a specific embodiment for a first-time user interface 500 with a graphical representation of a network hierarchy suitable for carrying out the various steps, processes, methods, and operations described herein is discussed with respect to FIG. 5, any of a variety of systems and/or processes may be utilized in accordance with embodiments of the disclosure. For example, the first-time user interface 500 can be provided in response to an event, such that it is not necessary to operate only on the first-time of setting up a network for segmentation. The elements depicted in FIG. 5 may also be interchangeable with other elements of FIGS. 1-4 and 6-8 as required to realize a particularly desired embodiment.

Figure 6:
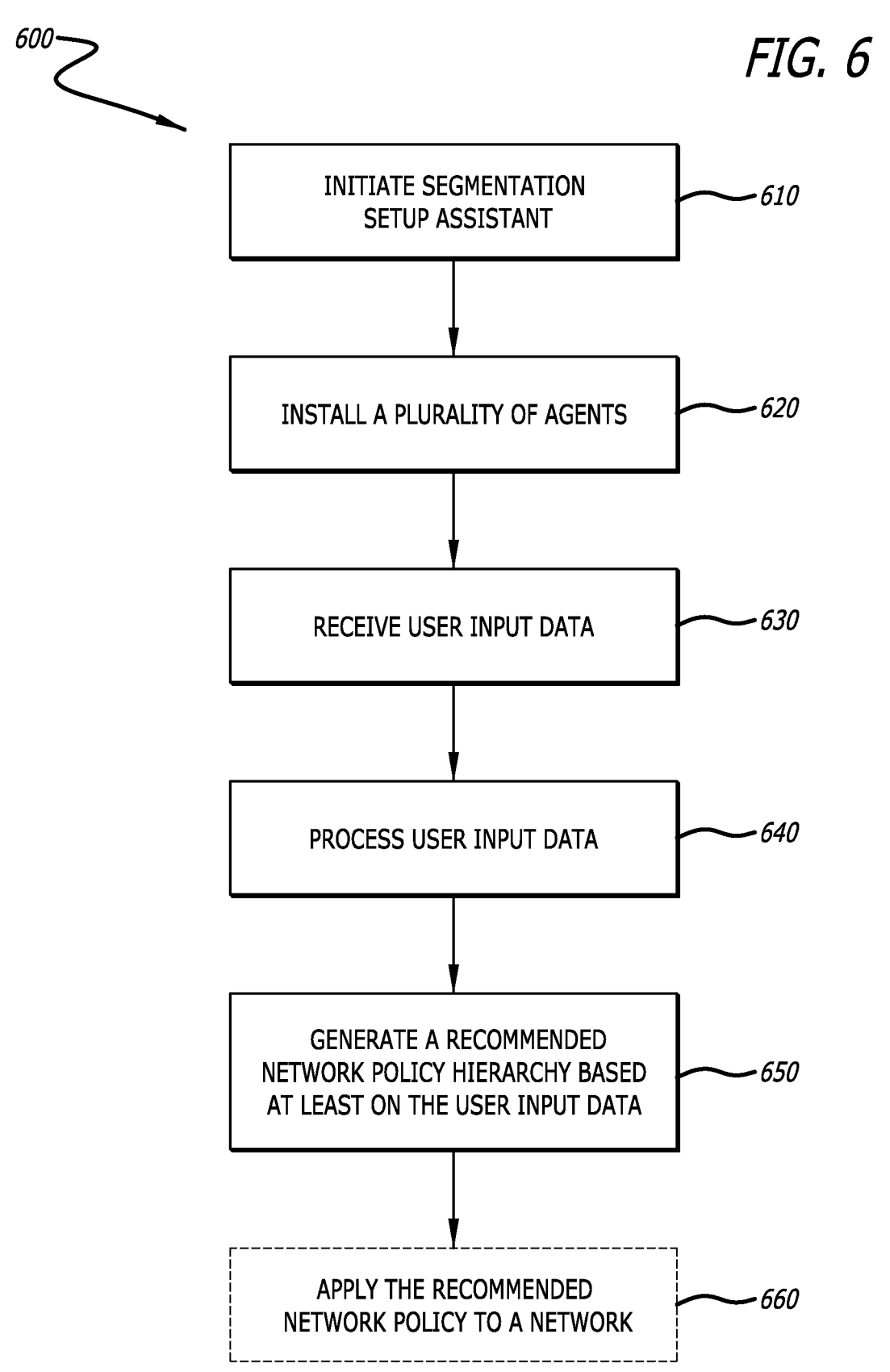
FIG. 6 is a flowchart depicting a process for applying a recommended network policy generated from a segmentation setup assistant in accordance with various embodiments of the disclosure.

Referring to FIG. 6, a flowchart depicting a process 600 for applying a recommended network policy generated from a segmentation setup assistant in accordance with various embodiments of the disclosure is shown. In many embodiments, the process 600 can initiate a segmentation setup assistant (block 610). Often, this can be in the form of a first-time user interface provided upon the initial setup process of a workload protection solution.

In some embodiments, the process 600 can install a plurality of agents (block 620). These agents can be deployed to various systems, devices, workloads, etc. In certain embodiments, the process 600 can determine a desired agent type and/or version to install depending on the current network status. As those skilled in the art will recognize, the desired agents can vary depending on the application, environment, or other factors that can vary between different deployments.

In a number of embodiments, the process 600 can receive user input data (block 630). This input data can often be received from a first-time user interface or similar segmentation setup assistant. The user input data can be data received in response to prompts or other passive input. As discussed in more detail below, the user input can include a variety of input types that be utilized in generating a recommend network segmentation. In additional embodiments, the process 600 can process or otherwise parse the user input data (block 640). This processing can be done by a workload protection logic or other similar system, process, or method.

In various embodiments, the process 600 can generate a recommended network policy hierarchy based at least on the user input data (block 650). In more embodiments, the process 600 can generate a recommended scope design which can be presented to a user via the first-time user interface and be utilized as a reference point for a further hierarchal application design. In further embodiments, the process 600 can generate a suggested label design which can be a starting point for creating one or more internet protocol (IP)/value pairs to provide context to various IP addresses and subnets used to represent a given application. Each of these types of recommendations can be utilized as a recommended network policy to apply to the network.

Although a specific embodiment for a process 600 for applying a recommended network policy generated from a segmentation setup assistant suitable for carrying out the various steps, processes, methods, and operations described herein is discussed with respect to FIG. 6, any of a variety of systems and/or processes may be utilized in accordance with embodiments of the disclosure. For example, the user input can be received with the help on one or more agents and/or data received from the plurality of agents. The elements depicted in FIG. 6 may also be interchangeable with other elements of FIGS. 1-5 and 7-8 as required to realize a particularly desired embodiment.

Referring to FIG. 7, a flowchart depicting a more-detailed process 700 for applying a recommended network policy generated from a segmentation setup assistant in accordance with various embodiments of the disclosure is shown. In many embodiments, the process 700 can initiate a segmentation setup assistant (block 710). Similar to the embodiment described in FIG. 6, this can often be in the form of a first-time user interface provided upon the initial setup process of a workload protection solution.

In a number of embodiments, the process 700 can prompt a user for organization structure (block 720). As shown above, this prompt can be in various forms, including a first-time user interface such as a hierarchal structure input window or other similar setup. In some embodiments, the prompt can allow for a user to input various IP addresses and/or subnets that can define the overall network organization.

In various embodiments, the process 700 can receive organization data (block 730). This organization data can be received in response to a user entering data into a first-time user interface, segmentation assistant setup window, or the like. In more embodiments, the organization data can be received, at least in part, from one or more of the plurality of agents deployed within the network.

In additional embodiments, the process 700 can prompt the user for infrastructure details (block 740). In some embodiments, infrastructure details can include all IP address and/or subnets that define your on-premises data centers or other similar devices/locations. In additional embodiments, the subnet or IP addresses input should be part of the parent organization. Often, the infrastructure details can indicate control of the name of the defined level.

In further embodiments, the process 700 can receive infrastructure data (block 750). As described above, this data can be received in response to user input from a first-time user interface, or the like. In more embodiments, the organization data can be received or supplemented, at least in part, from one or more of the plurality of agents deployed within the network.

In still more embodiments, the process 700 can prompt a user for environment details (block 760). In some of these embodiments, the prompts can be configured for a user to input definitions of IP address and/or subnets associated with non-production applications or hosts. These hosts can include, but are not limited to, development, lab, testing, and/or staging. Similar to the infrastructure data, the subnet or IP addresses defined in the environmental data for various embodiments should be part of or at least associated with the defined level.

In additional embodiments, the process 700 can receive environment data (block 780). As described above, this data can be received in response to user input from a first-time user interface, or the like. In more embodiments, the organization data can be received or supplemented, at least in part, from one or more of the plurality of agents deployed within the network.

In yet more embodiments, the process 700 can generate a recommended network policy hierarchy based at least on the received data (block 780). As those skilled in the art will recognize, the breaking down of the network into hierarchical groups can allow for flexible and scalable policy discovery and definition. In additional embodiments, the recommendation can assign an associated label with each subnet/IP address defined. This can include a key/value pair organization equal to the internal organization. In more embodiments, an additional format can be to include key/value pairs for infrastructure associated with data centers. In still additional embodiments, the recommendation can include an key/value pairs associated with pre-production items.

In several optional embodiments, the process 700 can apply the recommended network policy to a network (block 790). The application can be from a user operating a first-time user experience, segmentation setup assistant, or the like. In various embodiments, the recommended network policy can include a recommended hierarchy design, label design, scope design, and/or segmentation design for the network. Applying these designs to the network can allow for increased network security. Thus, utilizing the first-time user experience can allow for a faster, and more convenient method of quickly setting up a network for workload protection.

Although a specific embodiment for a more-detailed process 700 for applying a recommended network policy generated from a segmentation setup assistant suitable for carrying out the various steps, processes, methods, and operations described herein is discussed with respect to FIG. 7, any of a variety of systems and/or processes may be utilized in accordance with embodiments of the disclosure. For example, the prompts and receiving of data can be achieved in parallel or all in one pair of steps. For example, a first-time user interface can generate a series of prompts that generates a plurality of different data types that can be received by the process 700 at once. The elements depicted in FIG. 7 may also be interchangeable with other elements of FIGS. 1-6 and 8 as required to realize a particularly desired embodiment.

Figure 8:
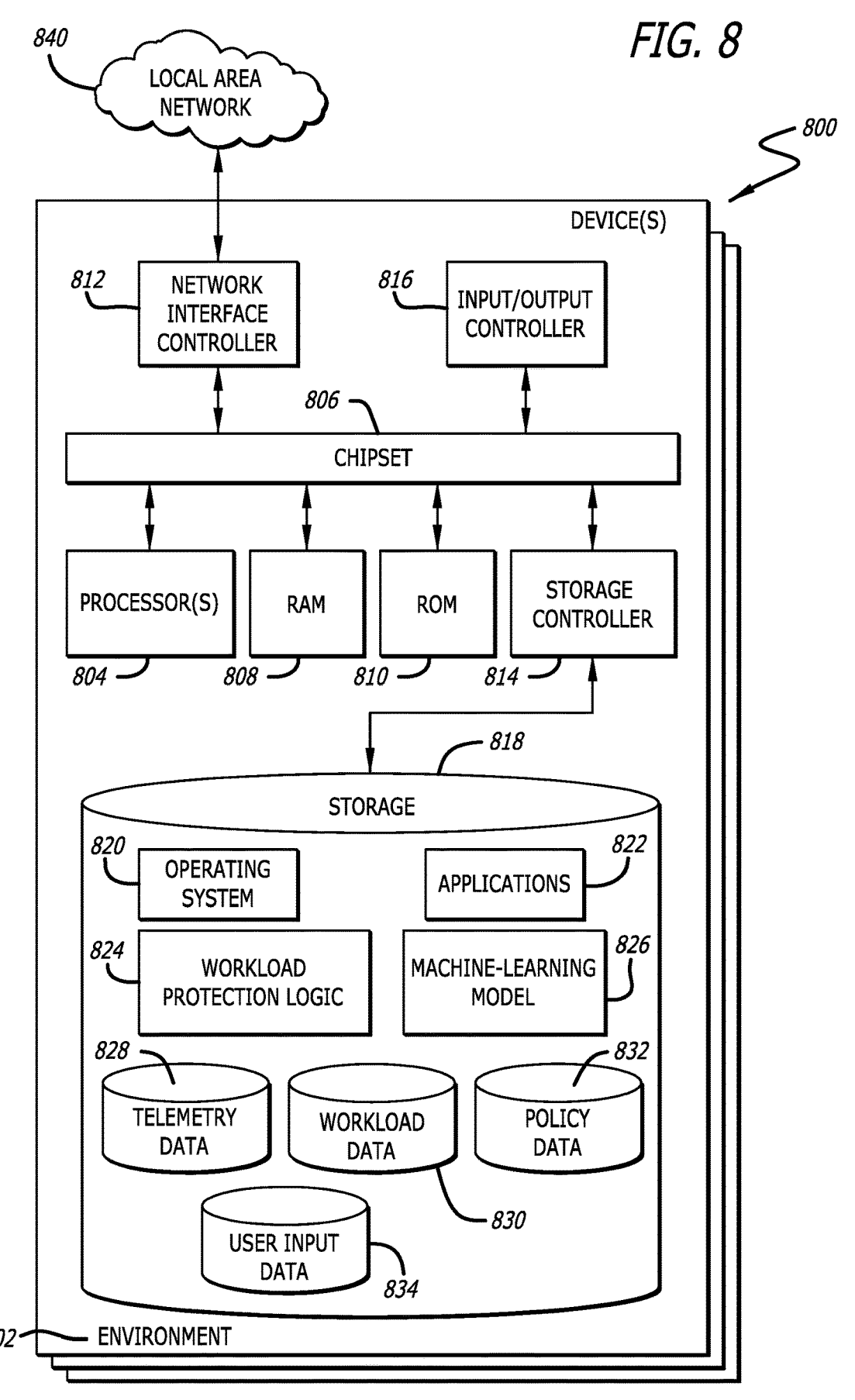
FIG. 8 is a conceptual block diagram of a device suitable for configuration with a workload protection logic in accordance with various embodiments of the disclosure.

Referring to FIG. 8, a conceptual block diagram of a device 800 suitable for configuration with a workload protection logic 824 in accordance with various embodiments of the disclosure is shown. The embodiment of the conceptual block diagram depicted in FIG. 8 can illustrate a conventional server computer, workstation, desktop computer, laptop, tablet, network device, access point, router, switch, e-reader, smart phone, centralized management service, or other computing device, and can be utilized to execute any of the application and/or logic components presented herein. The device 800 may, in some examples, correspond to physical devices and/or to virtual resources and embodiments described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to communicatively couple a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, and data 828, 830, 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-8. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8 and can include other components that are not explicitly shown in FIG. 8 or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a workload protection logic 824 that can be configured to perform one or more of the various steps, processes, operations, and/or other methods that are described above. While the embodiment shown in FIG. 8 depicts a logic focused on workload protection, it is contemplated that a more general "cybersecurity" logic may be utilized as well or in lieu of such logic. Often, the workload protection logic 824 can be a set of instructions stored within a non-volatile memory that, when executed by the controller(s)/processor(s) 804, can carry out these steps, etc. In some embodiments, the workload protection logic 824 may be a client application that resides on a network-connected device, such as, but not limited to, a server, switch, personal or mobile computing device in a single or distributed arrangement. In certain embodiments, the workload protection logic 824 can be a dedicated hardware device, cloud-based service, or be configured into a system on a chip package (FPGA, ASIC and the like).

In a number of embodiments, the storage 818 can include telemetry data 828. As discussed above, the telemetry data 828 can be collected in a variety of ways and may involve data related to multiple network devices. The telemetry data 828 may be associated with an entire network or a portion/partition of a network. This may also include a relationship of the various associated devices that are associated with each other. In additional embodiments, the telemetry data 828 can include data related to the configuration of one or more network devices, data centers, applications, or the like, including, but not limited to, IP addresses, subnets, etc. This telemetry data 828 can be utilized by a first-time user experience process to generate prompts, suggestions, or other interactions with a user when setting up a network for workload protection. As those skilled in the art will recognize, telemetry data 828 can be configured to track a variety of different aspects of a network, it's devices, and associated workloads.

In various embodiments, the storage 818 can include workload data 830. As described above, workload data 830 can be associated with various network devices, data centers, applications, or other processes within a network. Each workload may have additional workload data 830 associated with it including origin, status, label, scope, etc. In various embodiments, workload data 830 may be utilized to describe additional attributes of the workload, including one of: a workload's bandwidth usage, latency, traffic patterns, quality-related metrics, throughput, performance, security-related events, resource utilization, and/or scalability traits.

In still more embodiments, the storage 818 can include policy data 832. As discussed above, policy data 832 can include data that related to a network's configuration, such as hierarchy, segmentation, scope, labels, etc. In some embodiments, policy data 832 can be associated with one of: access control, quality-related policies, security, routing, traffic shaping, authentication/authorization, compliance, data retention/backup, remote access, wireless network policies, and/or any service level agreements. Policy data 832 can be utilized by the workload protection solution in various ways including, but not limited to, developing a segmentation policy, and/or generating one or more prompts during a first-time user experience.

In still more embodiments, the storage 818 can include user input data 834. As discussed above, user input data 834 can be received from various user inputs via first-time user experience prompts or the like. The user input data 834 can be combined or utilized in tandem with various data received from one or more agents deployed on the network. In certain embodiments, the user input data 834 can be received via one or more web-based protocols which can be stored on a temporary basis or parsed and stored in a long-term way within the user input data 834.

Finally, in many embodiments, data may be processed into a format usable by a machine-learning model 826 (e.g., feature vectors, etc.), and or other pre-processing techniques. The machine learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to learn the pattern of a network's current setup and/or any security needs of various network devices and generate predictions, configurations, and/or confidence levels regarding setting up a network for workload protection and/or segmentation, etc. In some embodiments, the ML model 826 can be configured to determine which method of generating those predictions would work best based on certain conditions or with certain network devices.

The ML model(s) 826 can be configured to generate inferences to make predictions or draw conclusions from data. An inference can be considered the output of a process of applying a model to new data. This can occur by learning from at least the telemetry data 828, workload data 830, policy data 832, user input data 834, and/or the underlying algorithmic data and use that learning to predict future configurations, outcomes, and needs. These predictions are based on patterns and relationships discovered within the data. To generate an inference, such as a determination on anomalous movement, the trained model can take input data and produce a prediction or a decision/determination. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 826 may be generated by human/administrator verifications or may compare predicted outcomes with actual outcomes. The training set of the ML model(s) 826 can be provided by the manufacturer prior to deployment and can be based on previously verified data.

Although a specific embodiment for a device 800 suitable for configuration with a workload protection logic 824 suitable for carrying out the various steps, processes, methods, and operations described herein is discussed with respect to FIG. 8, any of a variety of systems and/or processes may be utilized in accordance with embodiments of the disclosure. For example, the device may be in a virtual environment such as a cloud-based network administration suite, or it may be distributed across a variety of network devices such that each acts as a device and the workload protection logic 824 acts in tandem between the devices. The elements depicted in FIG. 8 may also be interchangeable with other elements of FIGS. 1-7 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and
a memory communicatively coupled to the processor, wherein the memory comprises a workload protection logic comprising instructions executable by the process that are configured to:
initiate a segmentation setup assistant;
deploy a plurality of agents;
receive user input data; and
transform the user input data into a recommended network policy hierarchy.

2. The device of claim 1, wherein the plurality of agents are deployed on the network.

3. The device of claim 2, wherein the workload protection logic is further configured to determine a desired type of agent to install.

4. The device of claim 2, wherein the workload protection logic is further configured to determine a desired version of agent to install.

5. The device of claim 1, wherein the user input data comprises at least groupings of workloads.

6. The device of claim 1, wherein the user input data comprises at least a definition of at least one internet protocol address associated with the network.

7. The device of claim 1, wherein the user input data comprises at least a definition of at least one subnet associated with the network.

8. The device of claim 1, wherein the user input data comprises at least a definition of both public and private internet protocol address ranges associated with the network.

9. The device of claim 1, wherein the recommended network policy comprises at least a label associated with each data center.

10. The device of claim 9, wherein each data center is assigned a key and value pair.

11. The device of claim 1, wherein the recommended network policy comprises a recommended scope design.

12. The device of claim 1, wherein the recommended network policy comprises a recommended label design.

13. The device of claim 1, wherein workload protection logic is further configured to generate a prompt or user input.

14. The device of claim 13, wherein the prompt is a graphical user interface configured to show a hierarchal structure of the network.

15. The device of claim 14, wherein the graphical user interface is further configured to receive scope data.

16. The device of claim 1, wherein the recommended network policy comprises at least a segmented network hierarchy.

17. The device of claim 1, wherein the recommended network policy is based on at least the user input data and data received from at least one of the plurality of agents.

18. A device, comprising:

a processor;

at least one network interface controller configured to provide access to a network; and a memory communicatively coupled to the processor, wherein the memory comprises a workload protection logic comprising instructions executable by the process that are configured to:

receive a request to initiate network segmentation;

determine one or more suitable agent types for the network;

deploy a plurality of the suitable agents;

generate a graphical user interface prompt configured to receive user input;

receive user input data from the prompt; and transform the user input data from the prompt into at least one recommended network segmentation.

19. The device of claim 18, wherein the at least one recommended network segmentation is based on at least the user input data and data received from at least one of the deployed agents.

20. A method generating an application dependency mapping, comprising:

receiving a request to initiate network segmentation;

determining one or more suitable agent types for the network;

deploying a plurality of the suitable agents;

generating a graphical user interface prompt configured to receive user input;

receiving user input data from the prompt; and generating transform the user input data from the prompt into at least one recommended network segmentation.

* * * * *